United States Patent

Thorn et al.

[15] 3,649,840
[45] Mar. 14, 1972

[54] RADIATION-SENSITIVE DEVICE UTILIZING A LASER BEAM TO MEASURE THE DISPLACEMENT OF AN OBJECT

[72] Inventors: Jurgen Thorn, Haar; Horst Moritz, Munich, both of Germany

[73] Assignee: Siemens Aktiengesellschaft, Berlin and Munich, Germany

[22] Filed: Mar. 13, 1970

[21] Appl. No.: 19,330

[30] Foreign Application Priority Data

Mar. 17, 1969 Germany ............... P 19 133 99.4

[52] U.S. Cl. .................. 250/231 R, 250/211 K, 250/209
[51] Int. Cl. .................................................. G01d 5/34
[58] Field of Search ........... 250/221, 222, 211 K, 209, 208, 250/211, 231, 234; 356/167, 172

[56] References Cited

UNITED STATES PATENTS

| | | | |
|---|---|---|---|
| 2,879,405 | 3/1959 | Pankove | 250/211 |
| 3,087,069 | 4/1963 | Moncrieff-Yeates | 250/211 |
| 3,159,750 | 12/1964 | Kazan | 250/231 |
| 3,193,686 | 7/1965 | Heinz | 250/211 |
| 3,258,601 | 6/1966 | Suleski | 250/211 |
| 3,354,311 | 11/1967 | Vali et al. | 250/234 X |

*Primary Examiner*—Walter Stolwein
*Attorney*—Hill, Sherman, Meroni, Gross & Simpson

[57] ABSTRACT

A device for continually measuring the displacement of an object utilizing a laser beam. A photoreceiver is attached to the object in such a manner as to be subject to displacement corresponding to the displacement of the object. The photoreceiver has a measuring photoelectric cell extending in the direction in which displacement is being measured. The photoelectric cell has a sensitivity which changes continuously in the direction of measurement. A source of a laser beam is positioned on a reference point, and the beam is directed toward the photocell to generate an electrical signal in response to the position of the beam on the cell. The beam is fanned out along a path which intersects and crosses the cell, and accordingly displacement of the object causes a displacement of the cell which generates a change in the electrical output. In order to produce an electrical output signal which is free from fluctuations due to causes other than the displacement of the object, a comparison photoelectric cell is disposed parallel to the measuring photocell, and the laser beam crosses the comparison cell as well. The comparison cell produces a signal which is fed to an amplifier and which may be used as a reference to compare the magnitude of the output from the measuring photoelectric cell. In addition, the amplifier for the comparison cell may be self adjusting to produce a constant output and may be coupled to the amplifier at the output of the measuring cell to control the amplification factor thereof. In this way, the amplification can be varied without losing the reference as a means for determining the displacement of the measuring cell.

9 Claims, 2 Drawing Figures

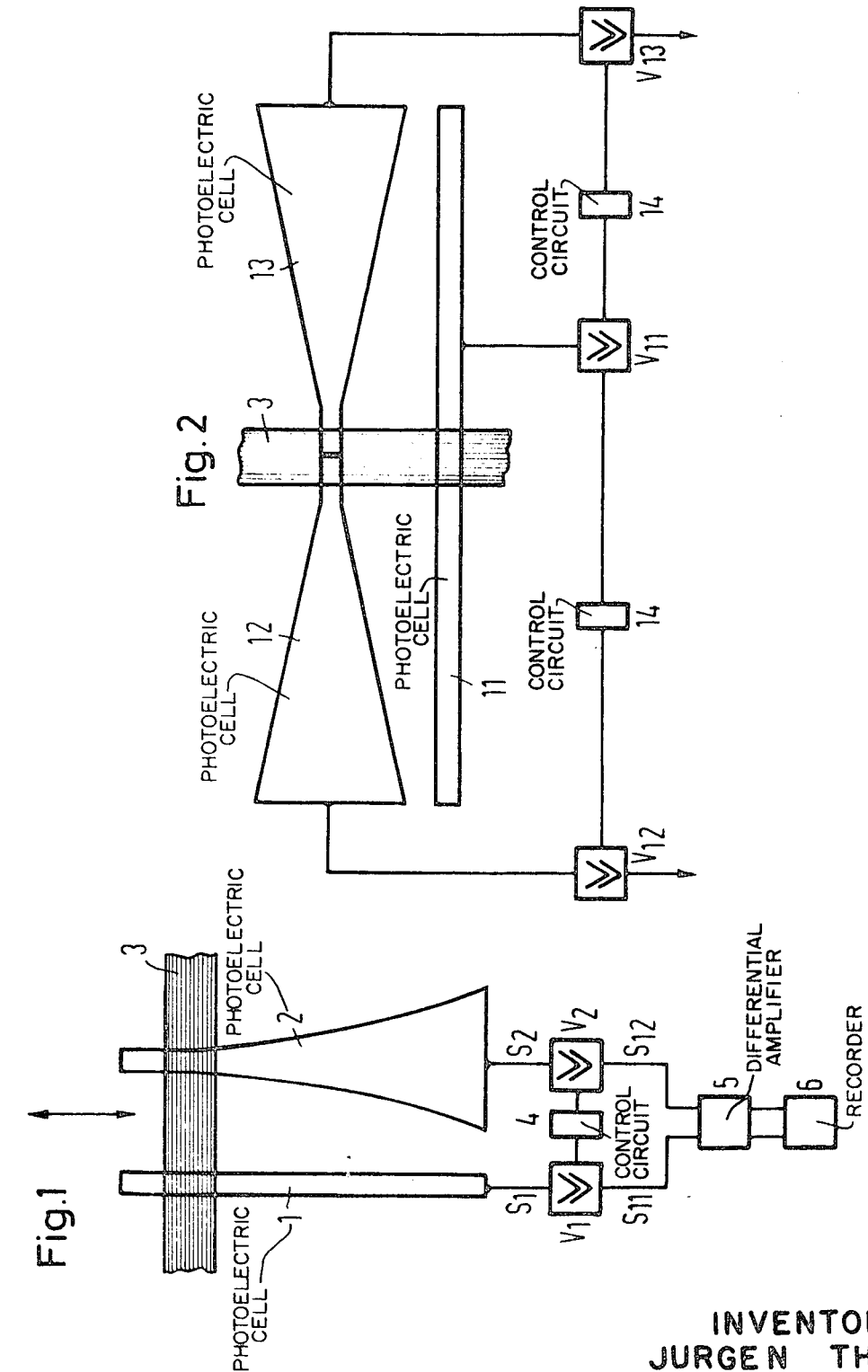

RADIATION-SENSITIVE DEVICE UTILIZING A LASER BEAM TO MEASURE THE DISPLACEMENT OF AN OBJECT

BACKGROUND OF THE INVENTION

Field of the Invention

The field of art to which this invention pertains is a means for measuring continuous displacements of objects and particularly of structural objects using a laser beam. In particular, the present invention relates to a device for measuring substantial displacements in the order of magnitude of several centimeters as well as for measuring considerably smaller displacements.

SUMMARY OF THE INVENTION

It is a principal feature of the present invention to provide an improved device for the measurement of a displacement of an object.

It is another feature of the present invention to provide a device for utilizing a laser beam to continually measure the shifting of an object.

It is an important object of the present invention to provide an improved laser beam measuring system.

It is also an object of the present invention to provide a laser beam displacement-measuring system which produces an electrical output directly in response to the displacement of an object being measured.

It is also an object of the present invention to provide a displacement-measuring device using a photoelectric cell having a sensitivity which increases along the length of the cell and for impinging a fanned out laser beam across the cell to generate an output in response to movement of the cell with respect to the beam.

It is another object of the present invention to provide a laser beam measuring system as described above wherein the photoelectric cell has a sensitivity which increases nonlinearly and in such a manner as to produce a linear electrical output.

It is an additional object of the present invention to provide a comparison photoelectric cell in parallel relation with a measuring photocell wherein the comparison cell has a substantially constant width along the length thereof and wherein the measuring cell has a continually changing width to vary the sensitivity thereof, and wherein a fanned-out laser beam is caused to cross both the comparison and measuring cell to produce separate output signals therefrom.

It is another object of the present invention to provide a laser beam displacement-measuring system as described above wherein each of the photoelectric cells have amplifiers coupled to the output thereof and wherein the amplifier at the output of the comparison cell is a substantially constant output amplifier to provide a reference signal for the measuring cell output signal.

It is a further object of the present invention to provide a measuring system as described above wherein the constant output amplifier is coupled to the amplifier at the output of the measuring cell to control the amplification thereof and thereby provide a self-adjusting and continuous reference signal for the measurement of the displacements of the measuring photocell.

It is also an object of the present invention to provide a system as described above wherein a differential amplifier and a recorder are coupled to the outputs of each of the photoelectric cells.

It is still another object of the present invention to provide photoelectric cells which increase in opposite directions so that movements of the cell in either direction with respect to a laser beam will produce an increasing electrical output.

These and other objects, features and advantages of the invention will be readily apparent from the following description of a preferred embodiment thereof, taken in conjunction with the accompanying drawings, although variations and modifications may be effected without departing from the spirit and scope of the novel concepts of the disclosure.

BRIEF DESCRIPTION OF THE DRAWINGS

FIG. 1 is a schematic illustrating the positioning of a comparison photoelectric cell and a measuring photoelectric cell side by side and showing the orientation of a fanned-out laser beam which crosses both of the photocells to generate separate output signals.

FIG. 2 is an illustration of another embodiment of the present invention in which a pair of oppositely arranged measuring photocells are used in conjunction with a constant width comparison cell.

DESCRIPTION OF THE PREFERRED EMBODIMENT

The present invention relates to a device for measuring the displacement or shifting of an object using a laser beam mounted on a reference plane. A photoreceiving device is attached to the object to be measured and has a variable sensitivity so that relative motion between the photoreceiving device and the laser beam will generate changing electrical signals.

Devices for the continuous measurement of shifting or displacement of structures are required for numerous uses. For instance, in the construction industry, it is often required to measure continuously the deformation of walls, bridge piers or the like. In taking such measurements, it is often impossible to find a reference level for the measurement since the ground and surrounding areas often deform with the structure being measured. This is principally true in the case of making load tests for bridge piers where measurements of deformation have to be made continuously over a period of several hours while the pier is under a certain load.

Such measurements are primarily done optically. In this case, an observer watches the position of a mark on the object being measured from a place sufficiently far away to be free of deformations. This is often done with the help of a telescope. However, such a system is often expensive due to the high cost of the expertise required in making these measurements.

Prior devices have utilized laser beams for the purpose of controlling the position of a machine or the like. These devices, however, are not suitable for long period recording of the shifting or displacement of an object. One of the problems has been to find a means for dealing with fluctuations in the operation of laser beams which could distort readings over a period of time. Also, prior devices have been capable of measuring only small displacements rather than displacements in the order of several centimeters which are possible by the present invention.

The present invention provides an apparatus which is capable of making such measurements. In the present system, a laser beam originates from a reference position and is directed onto a measuring photoelectric cell which is disposed to move with the shifting or deformation of the object being measured. The photoelectric cell has an absolute sensitivity which changes continuously in the direction in which the measuring is being accomplished. This sensitivity is brought about by a variation in the width of the cell from one end to the other.

It may be desirable to vary the width of the cell in a nonlinear manner so that the output from the cell will increase linearly with displacement. The nonlinearity of the photocell arrangement is required due to the unequal distribution of the radiation density of the fanned out laser beam.

In the alternate, a constant width photoelectric cell may be used and a filter may be arranged between the cell and the source of the laser beam in such a way that the filter changes its permeability continuously in the measurement direction. The filter, for instance, may be an absorption filter with the constant value of absorption increasing continuously from one end of the filter to the other.

Such a filter arrangement has the advantage of producing increasing sensitivity of the cell without requiring increasing width. In this way, a much narrower photocell can be utilized.

In order to determine the absolute position of the laser beam on the photoelectric cell and thereby to obtain a measurement of the absolute displacement of the object being measured, the present invention provides that a comparison photoelectric cell may be arranged parallel to the measuring cell. The comparison cell may have a constant sensitivity along its length. The fanned-out laser beam is then caused to impinge simultaneously on both the comparison cell and the measuring cell. Both of the photoelectric cells may be arranged on the load side of a differential amplifier.

The outputs of both of the photoelectric cells may be coupled to respective amplifiers. The comparison photocell may be coupled to an amplifier which is self adjusting and which provides a constant output signal. The output of this amplifier may then be used to control the amplification of the amplifier coupled to the output of the measuring photoelectric cell. In this way, a constant reference may be provided for the amplified measuring signal even though the level of amplification may be changed to suit the requirements of the system.

In a system using the pair of amplifiers with the comparison amplifier controlling the amplification of the measuring amplifier, a differential stage may be omitted in view of the cost of output of the comparison amplifier.

A recorder may be used to provide a continuous record of the amount of deformation or shifting of the object being measured over a period of time. The recorder would simply be coupled to the output of the amplifiers from the respective photoelectric cells.

A system according to the present invention can also be used to detect twistings or bendings of an object by utilizing a second measuring photoelectric cell having an absolute sensitivity which changes in the same direction as the sensitivity of the first measuring cell. A differential amplifier may be coupled to the output. A bending motion would produce a variation of the longitudinal shifting between the two measuring photoelectric cells such that their output signals would change unequally.

A system according to the present invention may also be utilized advantageously to control machines or apparatus. It is possible to determine the nominal position of a machine and utilize increases and decreases of the output signal from the measuring cell to operate a control and return the machine to its nominal plane.

Preferably to accomplish such a control according to this invention, two measuring photoelectric cells are to be provided having an absolute sensitivity which changes continuously in opposite directions such that the cells effectively increase in width from a center point between the cells. An amplifier is preferably arranged on the load side of each cell which can be adjusted by a constant output amplifier as already described. In this case also a comparison photoelectric cell may be provided, and this would extend the entire length of both of the measuring photoelectric cells so that only one automatically adjusting amplifier need be provided.

The above arrangement can be expanded so that machines are guided along a straight line or the like.

In further expanding the concepts embodied in the present invention, a laser beam can be utilized which produces two beams and wherein the receiver consists of two combined arrangements of measuring photoelectric cells which extend along one side of a right angle. Other arrangements, of course, may be proposed.

Referring to the drawings in greater detail, FIG. 1 shows two photoelectric cells 1 and 2 having their longitudinal direction lined generally parallel to the measuring direction which is indicated by the double arrow 2a.

The measuring photoelectric cell 2 has a photosensitive plane which widens continuously in the longitudinal direction. The width of the comparison photoelectric cell is constant over the entire length. Both cells are fixed to the object being measured.

A laser beam 3 is provided from a suitable source which source is disposed on a reference plane. The beam 3 is fanned out as shown and crosses both the cells 1 and 2.

If the object being measured shifts in position, the cells 1 and 2 will be displaced and signals $S_1$ and $S_2$ will be generated from the cells. It is apparent that the signal $S_1$ will remain constant with the variations in relative position of the laser beam 3, while variations in the signal $S_2$ will increase or decrease with the changing relative positions between the beam 3 and the widened cell 2.

To accomplish an absolute calibration of the system, namely a calibration which is independent of laser efficiency in various environmental conditions which accompany the shifting of the object being measured over a period of time, an automatically adjusted amplifier $V_1$ is arranged on the load side of the comparison photoelectric cell. This amplifier has an amplification which changes automatically to produce a constant output signal $S_{11}$.

The amplifier $V_1$ is then coupled to a control system 4 and from the system 4 to an amplifier $V_2$. The amplifier $V_2$ is coupled to the output of the measuring photoelectric cell 2 and has its amplification adjusted by the signal coming from the amplifier $V_1$. The outputs of both of the amplifiers $V_1$ and $V_2$ are coupled to a differential amplifier 5.

The differential amplifier 5 could be omitted in the arrangement shown in FIG. 1 due to the presence of the constant adjusting amplifier $V_1$ and the coupling of the output of that amplifier to the further amplifier $V_2$.

The laser radiation may also be modulated to increase the sensitivity of operation. Also, modulation has the advantage of reducing the effects of daylight or other straight light from the environment. Such straight light can be suppressed in a modulated system by the use of selectively absorbing filters or the like.

In FIG. 2, a similar type arrangement is provided which may be used for the control of the movement of a machine along a plane. The photoreceiver which is attached to the machine contains two photoelectric cells 12 and 13 which are arranged to have increasing sensitivities in opposite directions from a common center point 13a.

A comparison photoelectric cell is provided parallel to the two photoelectric cells 12 and 13 and has an output connected to an automatically adjusting amplifier $V_{11}$. The amplifier $V_{11}$ corresponds to the amplifier $V_1$ in FIG. 1 and is coupled to further amplifiers $V_{12}$ and $V_{13}$ over circuits 14.

A shifting or displacement of the laser beam 3 with respect to the load cells generates an output signal in either direction which can then be utilized to control the machine operations with respect to a given plane or line of movement. Here also, the relative motion between the beam and the cells is caused by the shifting of the photoelectric cells which are coupled in a suitable manner to the machine. The laser source is rigidly positioned on a reference plane at a distant point.

Such a device as described above has the advantage that the continuous adjustment of the machine is possible and not simply an adjustment after a given deviation is exceeded. By providing a similar receiver as shown in FIG. 2 both laterally and vertically and providing so-called cross fanned laser beams, an arrangement is provided for the control or guidance of a machine along a straight line.

The present invention is not limited to the specific arrangements described above. Especially, it is not necessary that these controls be used to guide a machine along a plane or along a straight line but could also be used for different proportional controls corresponding to the shifting of the machine other than simply returning the machine to a nominal position.

The use of a comparison photoelectric cell assures that the distance differences between the laser and the receiving arrangement do not have any effect on the system output. This is especially true in the case of moving machines being controlled whereby an overloading of the amplifiers could be accomplished when the machine is closest to the source of the laser energy.

We claim as our invention:

1. A system for continually measuring the amount of displacement of an object relative to a reference plane comprising:

means mounting a first measuring photoelectric cell on said object in such a manner as to be subject to a displacement in accordance with the displacement of said object, said first measuring photoelectric cell having an absolute sensitivity which changes continuously in the direction of the displacement to be measured, a reference point, a source of a laser beam originating from said reference point, said laser beam being fanned out in a direction intersecting and crossing said photoelectric cell, a comparison photoelectric cell being arranged on said object substantially parallel to said measuring photoelectric cell, said comparison photoelectric cell having a substantially constant absolute sensitivity along its length, electrical means coupled to the outputs of said photocells and using the combined outputs to develop a resultant signal, whereby displacement of said object and hence of said first measuring photoelectric cell causes said laser beam to sweep said first measuring photoelectric cell and generate an electrical signal which is indicative of the amount of displacement of said object.

2. A displacement measuring system in accordance with claim 1 wherein said photoelectric cell contains a photosensitive plane having a width which increases from one end of the cell to the other along the direction of displacement being measured.

3. A displacement measuring system in accordance with claim 2 wherein the increase in the width of the cell along the length thereof is nonlinear such that the output signal generated from the cell changes linearly with the sweeping of the beam along the length of the cell.

4. A displacement measuring system in accordance with claim 1 wherein said photoelectric cell includes a filter having a filter characteristic which changes continuously in the direction of the displacement to be measured.

5. A displacement measuring system in accordance with claim 4 wherein said filter is an absorption type filter having a permeability which increases essentially wedgelike along the direction of measurement.

6. A displacement system in accordance with claim 1 wherein a first self adjusting amplifier is coupled to the output of the comparison photoelectric cell, said self adjusting amplifier producing a substantially constant output, a further amplifier coupled to the output of the measuring photoelectric cell, and means coupling an output of said first amplifier to said further amplifier to control the amplification thereof.

7. A displacement system in accordance with claim 6 wherein a recorder is coupled to the outputs of said first and further amplifiers.

8. A displacement system in accordance with claim 1 wherein a differential amplifier is coupled to the outputs of said photoelectric cells.

9. A displacement system in accordance with claim 1 wherein a second measuring photoelectric cell is provided oppositely of said first measuring photoelectric cell and has increasing sensitivity in a direction oppositely of the direction of increasing sensitivity of said first measuring photoelectric cell, whereby the displacement of a moving object along a plane can be determined relative to a fixed line of travel.

* * * * *